(12) United States Patent
Eggert et al.

(10) Patent No.: US 8,126,269 B2
(45) Date of Patent: Feb. 28, 2012

(54) METHOD AND DEVICE FOR CONTINUOUS FIGURE-GROUND SEGREGATION IN IMAGES FROM DYNAMIC VISUAL SCENES

(75) Inventors: Julian Eggert, Obertshausen (DE); Daniel Weiler, Niedemberg (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 667 days.

(21) Appl. No.: 12/271,696

(22) Filed: Nov. 14, 2008

(65) Prior Publication Data

US 2009/0129675 A1 May 21, 2009

(30) Foreign Application Priority Data

Nov. 16, 2007 (EP) .................................... 07120890

(51) Int. Cl.
*G06K 9/34* (2006.01)
(52) U.S. Cl. ........ 382/173; 382/107; 382/164; 382/176; 382/190; 382/236; 375/240.16
(58) Field of Classification Search .................. 382/103, 382/107, 164, 173, 176, 190, 236, 243, 302; 358/453; 348/169; 235/411; 375/240.16
See application file for complete search history.

(56) References Cited

U.S. PATENT DOCUMENTS

| | | | | |
|---|---|---|---|---|
| 6,665,342 | B1 * | 12/2003 | Brown et al. | 375/240.16 |
| 7,274,803 | B1 * | 9/2007 | Sharma et al. | 382/107 |
| 2006/0245618 | A1 * | 11/2006 | Boregowda et al. | 382/107 |
| 2006/0285745 | A1 | 12/2006 | Paragios et al. | |
| 2008/0130948 | A1 * | 6/2008 | Ozer | 382/103 |

OTHER PUBLICATIONS

Cremers, D., et al., "A Review of Statistical Approaches to Level Set Segmentation: Integrating Color, Texture, Motion and Shape," International Journal of Computer Vision, Aug. 6, 2006, pp. 195-215, vol. 72, No. 2.
Yilmaz, A., et al., Object Tracking: A Survey, ACM Computing Surveys, Dec. 2006, pp. 1-45, vol. 38, No. 4.
Yilmaz, A., et al., "Contour-Based Object Tracking with Occlusion Handling in Video Acquired Using Mobile Cameras," IEEE Transactions on Pattern Analysis and Machine Intelligence, Nov. 2004, pp. 1531-1536, vol. 26, No. 11.
European Search Report, European Patent Application No. 07120890.4, Apr. 22, 2008, 10 Pages.

* cited by examiner

*Primary Examiner* — Samir Ahmed
*Assistant Examiner* — Ali Bayat
(74) *Attorney, Agent, or Firm* — Fenwick & West LLP

(57) ABSTRACT

A method for segregating a figure region from a background region in image sequences from dynamic visual scenes, comprising the steps of: (a) acquiring an image; (b) determining local motion estimations and confidences for each position of the image; (c) modifying a level-set function by moving and distorting the level-set function with the local motion estimations and smearing it based on the local motion confidences, to generate a predicted level set function that is geometrically in correspondence with the image and diffused at positions where the confidence of the motion estimation is low; (d) obtaining input features of the image by using a series of cues; (e) calculating a mask segregating the figure region from the background region of the image using the modified level-set function and the obtained input features; (f) extracting the figure region from the image; and repeating steps (a)-(f) until a termination criterion is satisfied.

11 Claims, 4 Drawing Sheets

METHOD AND DEVICE FOR CONTINUOUS FIGURE-GROUND SEGREGATION IN IMAGES FROM DYNAMIC VISUAL SCENES

RELATED APPLICATIONS

This application claims priority to European patent application 07 120 890.4 filed on Nov. 16, 2007 which is incorporated by reference herein in its entirety.

FIELD OF THE INVENTION

The present invention relates to a method and a device for the continuous segregation of a part of an image from a background in dynamic scenes.

BACKGROUND OF THE INVENTION

In image processing and computer vision applications, figure-ground segregation is an important processing step that determines to a large extent the quality of many post processing stages. These latter include e.g. object detection, object classification, the accurate estimation of object properties, the determination of object boundaries and object overlapping, etc. If the figure-ground segregation is not sufficiently accurate, object classification may fail because parts of an image are interpreted as belonging to an object even if they do not.

In dynamic scenes where objects move, transform and change its appearance, the problem is not only to determine accurately which parts of the image belong to an object, but also how these parts change over time. The challenge is to keep the sub-regions of an image that are identified as "figure" as accurately as possible on the object, despite an object's considerable changes in position, geometrical appearance, color, illumination and reflection, to name only a few.

One approach is to give a figure-ground segregation system hints on how the object's appearance is actually changing, measured via some other visual channels. Many current systems for figure-ground segregation do either a) not take advantage of these hints from other channels or b) use only very simple and limited hints (like the assumed translation of an object).

In computer vision, figure-ground segregation is the process of taking an image and separating parts or sub-regions of an image which correspond to an object of interest from those parts that do not. In short, each image pixel position is assigned a two-valued label with e.g. values 1 or 0, with 1 indicating the object and 0 the background. The result is a binary mask with the same size as the original image, which can be used for other computer vision processes applied to the image to cut out the effects produced by the background, improving all processes related to extracting specific information about the object.

Figure-ground segregation is a very well studied area of computer vision. It usually consists of identifying local properties or image features that are specific for the object region and that make this region distinguishable from the rest of the image (the ground). As an example, such features can be a particular type of color or a texturization pattern, but also indirectly processed features like gradient magnitude (e.g., the degree of change of a feature) or dynamic cues (e.g., the coherence of motion), or even a given model of an objects appearance.

Current algorithms for figure-ground segregation then take the characteristic image features that identify an object and compare them at all image positions with the features that are measured at the currently available image. The comparison results in a score that determines the degree of "figure" at each position. The task is then to find the regions for which the score is maximal. One way to do this is by setting up a mathematical functional (an integral that depends on a function that describes the region that characterizes the "figure" part) that integrates the "figure" scores over all positions of a figure region, which can then be studied by varying the figure region. The figure-ground segregation which best characterizes the current image is then gained by a maximization of the overall "figure" score functional. Maximization techniques of such functionals lead to development equations which describe the local change of the "figure" part function in order to fulfill a gradient ascent into the direction of a maximal functional score. The energy functional can be extended with additional constraints on the region borders, e.g. taking into consideration curvature length and smoothness. Prominent representatives for figure-ground segregation algorithms of this kind are so-called two-region level-set methods for image segmentation. See Osher, S., Sethian, J. A.: Fronts propagating with curvature-dependent speed: Algorithms based on Hamilton-Jacobi formulations. J. Comput. Phys. 79 (1988) 12-49 and Rousson, M., Deriche, R.: A variational framework for active and adaptive segmentation of vector valued images. IEEE Workshop on Motion and Video Computing, Orlando, Fla. (December 2002) which are incorporated by reference herein in their entirety.

A second well-studied area of computer vision is optical motion estimation. Here the local deformations between two image frames are estimated, i.e., the goal is to find correspondences between local patches so that one can say how the patches of the first image have potentially moved to constitute the patches of the second image. To estimate the patch correspondences, a general assumption about the patch appearance change over time, and in particular from the first to the second image, is required. A standard assumption is that the appearance of the patches does not change, so that we search the same patches from the first in the second image, only at different positions, or that they change their appearance slowly and continuously.

Motion estimation is inherently ambiguous as a result of the nature of its signals (local patches which, for example, lead to the motion aperture problem). This means that the estimations result in multiple possible motions of a patch, which can be expressed either fully probabilistically or in a reduced form, by indicating a confidence for possible motions. See Weiss, Y., Fleet, D.: Velocity likelihoods in biological and machine vision. In: Probabilistic Models of the Brain: Perception and Neural Function, MIT Press (2002) 77-96 and Willert, V., Eggert, J., Adamy, J., Koerner, E.: Non-gaussian velocity distributions integrated over space, time, and scales. In: IEEE Trans. Syst., Man, Cybern. B. Volume 36. (June 2006) 482-493 which are incorporated by reference herein in their entirety.

Optical flow algorithms constitute an approximation of the motion between two images, in the sense that they provide a vector field defined across the image plane, so that each pixel of, for example, the first image has attached a corresponding flow vector that indicates where a local image patch around this pixel has moved to when we go to the second image. Multiple motion hypotheses are therefore neglected in these algorithms, only a single confidence for the motion vector is passed for each position. Examples of standard optical flow algorithms are described in Horn, B. K. P., Schunck, B. G.: Determining optical flow. Artif. Intel. 17(1-3) (1981) 185-203, Beauchemin, S. S., Barron, J. L.: The computation of optical flow. ACM Comp. Surv. 27(3) (1995) 433-467, and Singh, A.: An estimation-theoretic framework for image-flow computation. In: 3rd IEEE ICCV. (1990) 168-177 which are all incorporated by reference herein in their entirety.

A third area from computer vision that is related to this invention is object tracking. Object tracking refers to locating an object in a sequence of consecutive images and constitutes an elementary task in high level video analysis. In Yilmaz, A., Javed, O., Shah, M.: Object tracking: A survey. ACM Comput. Surv. 38(4) (2006) 13, which is incorporated by reference herein in its entirety, a comprehensive survey of object tracking algorithms is given. Depending on the vision task, object tracking algorithms are based on several object representations (e.g. single point; rectangular, elliptical and part-based multiple patches; object contour and silhouette), object detection strategies (e.g. point detectors, background subtraction and image segmentation) and prediction methods for the object location (e.g. probabilistic and deterministic, parametric and non-parametric models). Non-rigid object deformation (e.g. a walking person), complex and rapid object movements (e.g. playing children), entire object appearance changes (e.g. front side vs. back side) and object occlusions form some of the numerous challenges in the field of object tracking.

It is therefore an object of the invention to provide an improved method and device for figure-ground segregation.

SUMMARY OF THE INVENTION

This object is achieved by a method and a device according to the independent set of claims. Advantageous embodiments are defined in the dependent claims.

In this invention, the displacement information of small patches calculated for 2 consecutive images in an image sequence are used as additional hints for an objects' appearance change. This information is fully used by combination with a suitable figure-ground segregation method that is able to process it, improving the segregation process over time when otherwise considerable object appearance changes would render an accurate figure-ground segregation over time error-prone or computationally very costly.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE FIGURES

These and other aspects and advantages of the present invention will become more apparent when studying the following detailed description of the invention, in connection with the drawing in which.

DETAILED DESCRIPTION OF THE INVENTION

Figure 1:
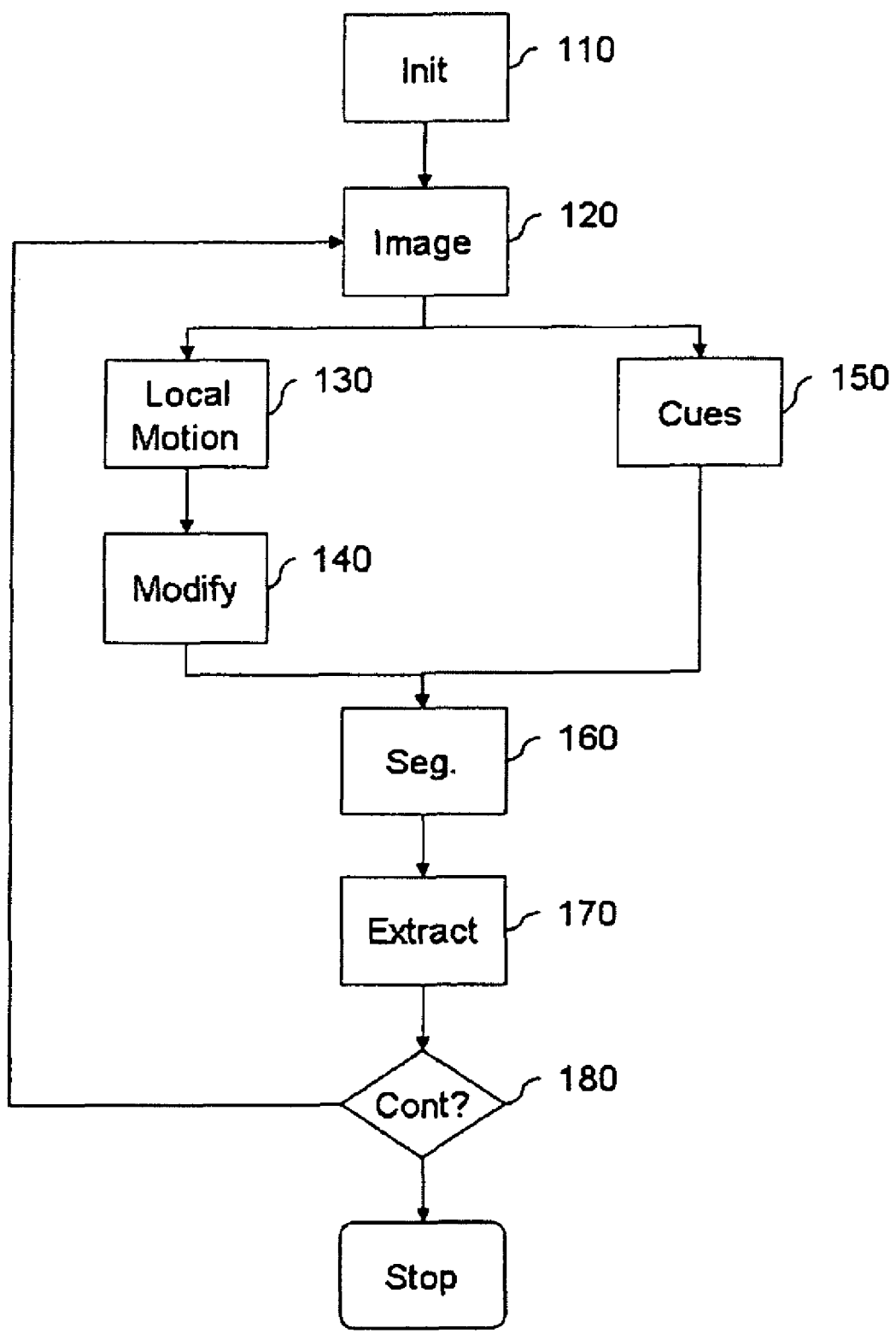
FIG. 1 shows a method according to a first embodiment of the invention.

A preferred embodiment of the present invention is now described with reference to the figures where like reference numbers indicate identical or functionally similar elements. Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus.

Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 shows a method according to a first embodiment of the invention. It is assumed that the images are to be separated into the two regions $\Omega_f$ (figure) and $\Omega_b$ (background).

The core of the method is a level-set (LS) function $\emptyset(x, y)$ that is used to describe a height field from which the figure and background regions Of and 06 can be extracted by defining $$\Omega_f = \{x, y : \phi(x, y) > 0\}$$

and $$\Omega_b = \{x, y : \phi(x, y) > 0\},$$

so that the figure region is defined by all positions where the LS function is larger than 0 and the background region is defined by all the positions where the LS function is smaller than 0 (the portion where the LS function is equal to 0 constitutes the border between figure and ground).

The level-set function is modified as a result of the figure-ground segregation algorithm, resulting in a relaxation algorithm that optimizes a score functional that incrementally provides an improved description of the figure versus the ground areas. The level-set function also enters the algorithm as an initial condition; in a continuous setting, a modified version of the LS function from the last time step is used to start the figure-ground segregation of the current time step.

The individual method steps are as follows:

In step 110, the method is initialized by providing an initial image $I_0(x, y)$ and an initial LS function $\phi_0(x, y)$. The initial image can be either chosen by user interaction or by other visual processing modules, like e.g. a module that extracts "interesting" regions of the scene with high probability to contain an object. The LS function can also be set by user interaction, delineating the approximate region where an object is, or by other visual processing modules which provide rough estimations about an objects position and extension wherein the object can be a real-world physical object.

In step 120, an image $I_t(x, y)$ of the scene is taken by an image acquisition device, e.g. a camera.

In step 130, the local motion is calculated. In other words, local motion hypotheses $M_t(x, y)$ are extracted for each point of the image. The motion hypotheses describe where the patches around the image positions (x, y) have potentially moved from the first image to the second one. The motion estimation information requires some minimal confidence data for the later combination with the figure-ground segregation, so that probabilistic motion extraction methods have to be used here from which these can be calculated.

At least two images, namely at least one previous image, e.g. $I_{t-1}(x, y)$ and the current image $I_t(x, y)$ are used to estimate the local motion that describes the displacements that patches from the first image have undergone to give as a result an approximated version of the second image. This means that the probable geometrical distortions are estimated that describe how the second image can be gained from the first one if the first one is warped geometrically with this information. The local motion estimations can be improved by the addition of global motion pattern constraints, which results in motion hypotheses $\hat{M}_t(x, y)$. Then, the job of the motion estimation stream is basically done.

Alternatively, as an approximation, standard optical flow methods can be used but since they usually do not provide confidence data for the motion vectors, this data has to be extracted by some other means via suitable heuristics (a possibility is e.g. to look at the underlying structure/texture in the image and return lower confidences if this structure is not present or ambiguous).

In step 140, the LS-function is modified. It is assumed that the figure has been segmented during the last time step and that a corresponding LS function is available. If the object that has to be segmented now moves, the LS function does not match so that the segmentation algorithm eventually fails to recover the object. Therefore, to find a better approximate LS function for the current time step, the last time step LS function is updated by warping and smearing it with the probabilistic motion estimation results. The outcome is that the LS function is shifted according to the motion estimations, so that it matches again with the displaced object, and that it takes into account where the motion information is reliable and where not. With such initial conditions, the chances to recover the object using the segmentation algorithm are highly enhanced, allowing the system to do continuous figure ground segregation despite considerable geometrical changes over prolonged periods of time.

The modification of the last time step LS function occurs by incorporation of the information from the motion estimation part of the method. In detail, the LS function $\phi_{t-1}(x, y)$ from the last time step is warped (moved and distorted spatially) and smeared to get the transformed LS function predicted for the current time step $\phi_t(x, y)$. This is used as an initial condition for the current time step figure-ground segregation of the input image $I_t(x, y)$, resulting in an improved LS function $\phi_t(x, y)$ that better segments the figure from the background. The figure-ground segregation itself uses a predefined set of features $\vec{F}(x, y)$ that is gained by preprocessing the input image, but that can also contain the motion information $M_t(x, y)$ and $\hat{M}_t(x, y)$, or feature maps from other sources that have been aligned with the camera coordinate system from the images $I_t(x, y)$.

Technically, the modification of the last time step LS function may be implemented in several ways. In one embodiment of the invention, the full probabilistic motion estimation is used, the LS function is shifted into all possible directions of motion and a pixel wise addition of all shifted LS functions weighted with their respective probabilities is performed at each position. If an optical flow algorithm is used, which returns only a single motion hypothesis per position, one may warp the LS function according to the optical flow vector field, and afterwards apply a procedure to smoothen the LS gradients at positions of low confidence, either by directly adjusting the steepness at the figure region boundary or by applying a position-dependent spatial diffusion determined by the motion vector confidence, with low confidences resulting in high diffusion constants and therefore high smearing, whereas high confidences result in low diffusion constants and low smearing.

In step 150, the cues $\vec{F}(x, y)$ are calculated. As step 150 is independent of step 140, the two steps may be carried out in parallel.

In step 160, the object ("figure") and the background are segregated using the cues and the LS function.

In step 170, the object is extracted. This involves the calculation of the figure region covering the object and derived measurements, like its position, speed and properties, as well as passing this information to other postprocessing modules.

In step 180, it is decided, whether the method shall continue. If yes, the method jumps back to step 120 in order to take the next image. If no, the method stops. The check can be automatic, e.g. by evaluating how probable it is that the method has lost track of the object or the desired figure region. Alternatively, this step can be controlled by other processing modules or by user interaction.

Generally, the method may be implemented on a computer. Optionally, the result of the above method may be output to specialized modules, e.g. for object tracking. In addition, the motion estimation system may be enhanced and extended by more global motion assumptions for the figure region. This is useful e.g. for those positions of the image on which no confident local motion measurement is possible, which is the case if no texture is present at all. A global motion assumption would then constrain the motions to a motion pattern of a particular kind, e.g. of the group of affine motion patterns containing a mixture of translation, expansion and rotation, therefore imposing the global motion pattern on the positions with low confidence in the local motion measurement.

Figure 2:
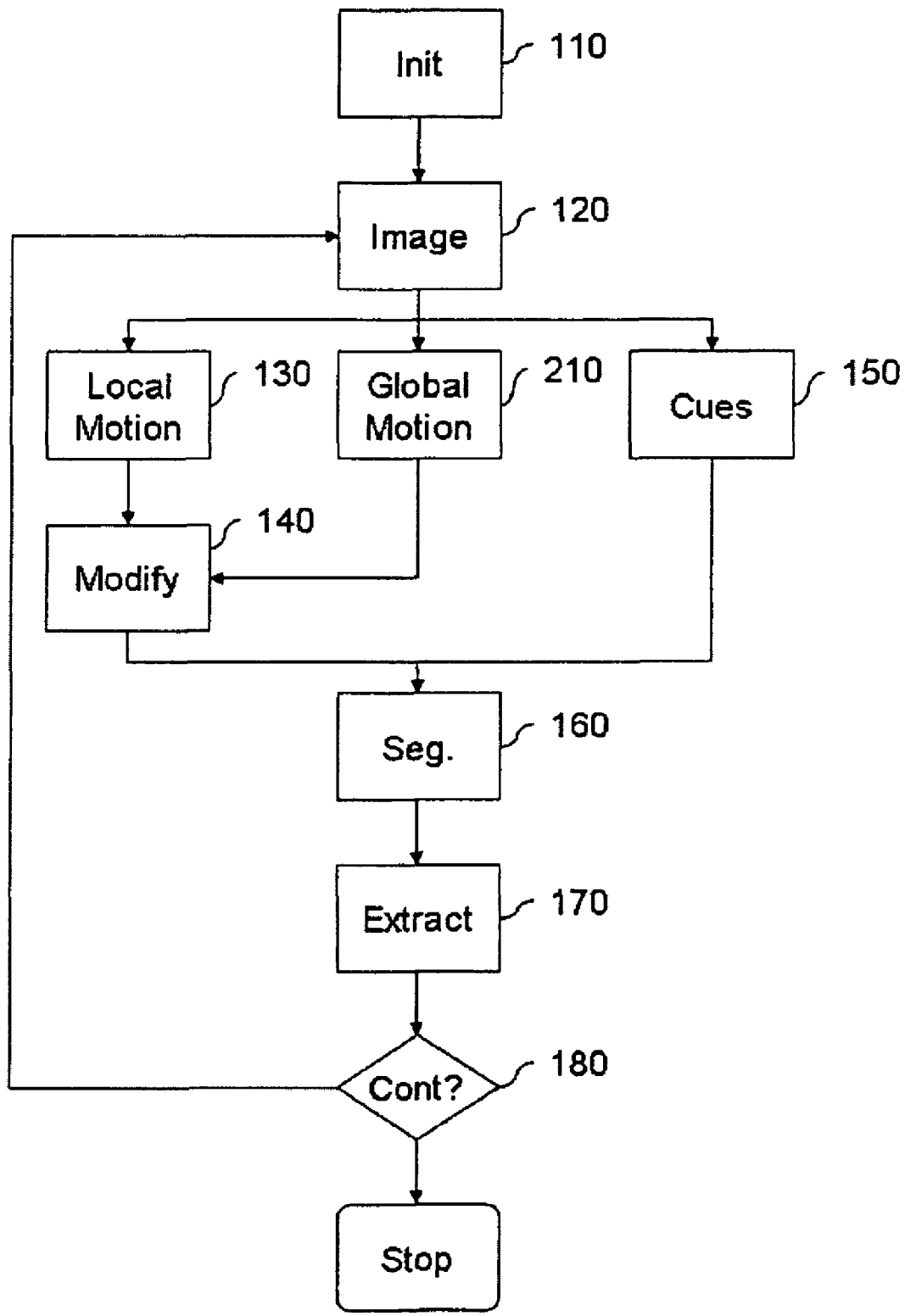
FIG. 2 shows a method according to a second embodiment of the invention.

FIG. 2 shows a flowchart of a method according to a second embodiment of the invention. Besides the steps already described in relation to FIG. 1, bearing the same reference signs, the flowchart further comprises a step 210, wherein a global motion pattern is extracted.

In this step, for the extraction of the global motion pattern the local motion estimations from the figure area are taken, the best match between them and the set of allowed global motion patterns is searched, and the winning global motion pattern $\hat{M}_f(x, y)$ is returned, which can then be merged with the local motion estimations.

The consideration of motion information for the prediction of the next object contour also enables the incorporation of compensation mechanisms from external sources. This would be the case if, for example, one uses the method on camera images gained from a moving platform like a robot or a car, from which some information about its own egomotion is available, then the expected motion may be estimated (in a similar way to the global motion pattern $\hat{M}_f(x, y)$) and used to preprocess the input images accordingly or merged with the local motion measurements, resulting a better prediction of the next LS function.

Figure 3:
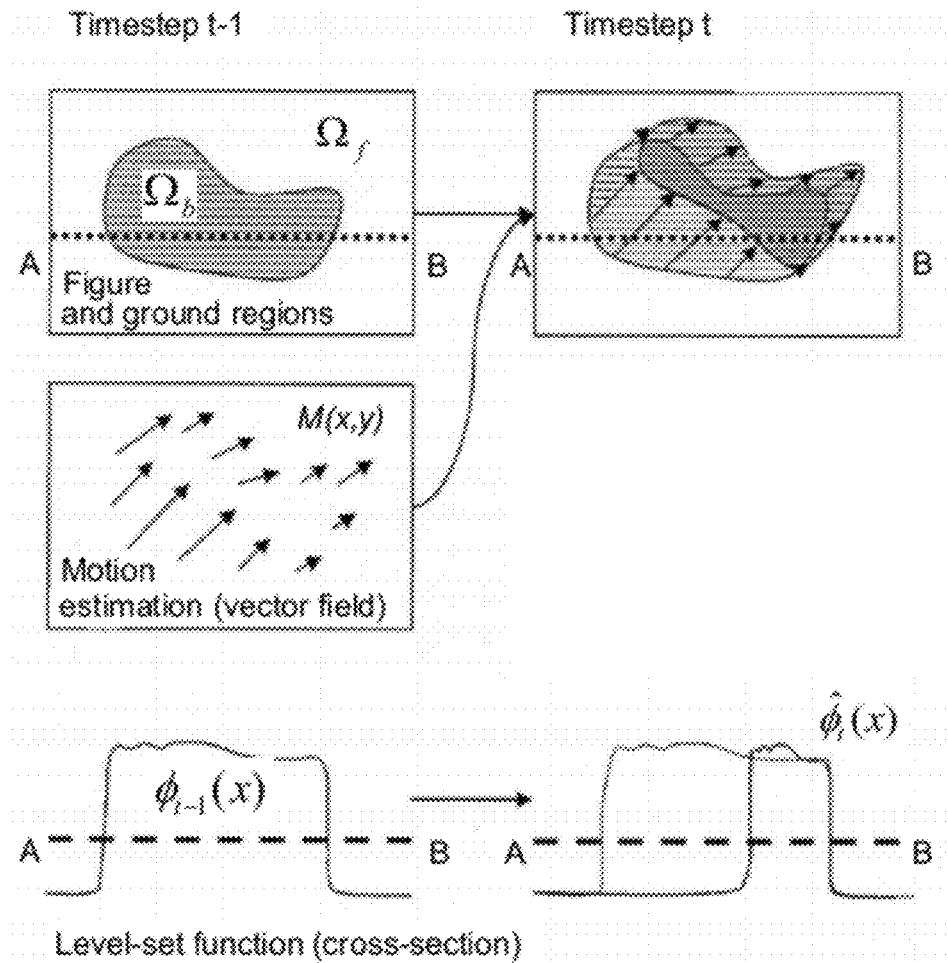
FIG. 3 shows geometrical modification of the level-set function by a motion field.

FIG. 3 shows the geometrical modification of the level-set function by a motion field.

LS-based segmentation methods are sensitive to local extrema (maxima) in their functional, so that different initial conditions can lead the system to very different and sometimes erroneous solutions for each time step. The crosstalk between the two processing streams allows improving the initial conditions for the figure-ground segregation system by spatially moving and distorting the LS function (which is responsible for the figure-ground segregation) consistently with the motion measurements, so that the segregation system is kept approximately in sync with motions in the image sequence. This is shown schematically in FIG. 3 top, where the figure and ground regions are adjusted according to a vector field gained from the motion hypotheses $M_f(x, y)$ and optionally $\hat{M}_f(x, y)$. In FIG. 3 bottom, a cross-section of the level set function along a horizontal dotted line is shown. The border between figure and ground is given by those positions where the LS function crosses zero level (dashed line). The motion measurements basically shift the level-set function according to the motion vectors, so that if an object is moving and the movement can be captured by the motion estimation system, the LS function will keep moving along with the object, providing better initial conditions and therefore facilitating the segmentation.

In addition, the incorporation of probabilistic or confidence measures from the motion estimation system allows the initial conditions to prepare optimally for the new input.

Figure 4:
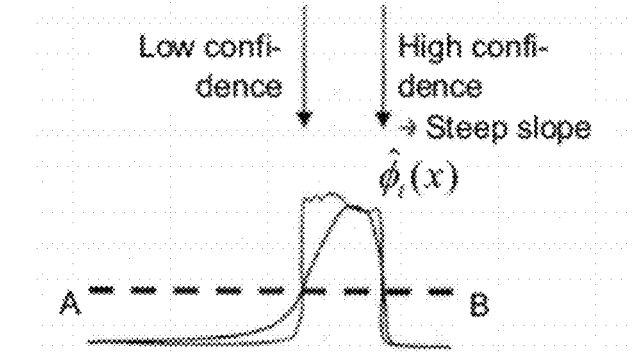
FIG. 4 shows modification of the level-set function by motion confidence.

FIG. 4 shows the modification of the level-set function by motion confidence. At image positions where confidence is low, the LS-function decreases its steepness (its gradient), leading to a faster readjustment of the segmented regions if the currently incoming input image supports this from its features. To the contrary, at image positions where confidence is high, the LS function increases its steepness, which results in a slower readjustment during the segmentation procedure so that these positions serve as confidence anchors which constrain the segmentation process. In a way, confidences act as a diffusion filter, with low confidences leading to higher and high confidences to lower diffusion and smearing. This is shown in FIG. 4 where the LS function cross-section gets a small slope on the left side (where the confidence is low), but on the right side, where the confidence is high, the slope remains steep.

Taking the motion, distortion and diffusion transformations together, one obtains improved initial conditions for the figure-ground segregation which helps the relaxation algorithm to arrive faster at more accurate solutions, improving computation time and segmentation capabilities. Mathematical details of the above-described methods are described in more detail below.

The invention also comprises a device for segregating a figure region from a background region in image sequences. The segregation device may comprise an optical flow estimation module that extracts patch correspondences between subsequent images, a figure segmentation module, and a proper update of the conditions of the figure segmentation module based on the results from the optical flow estimation.

Figure 5:
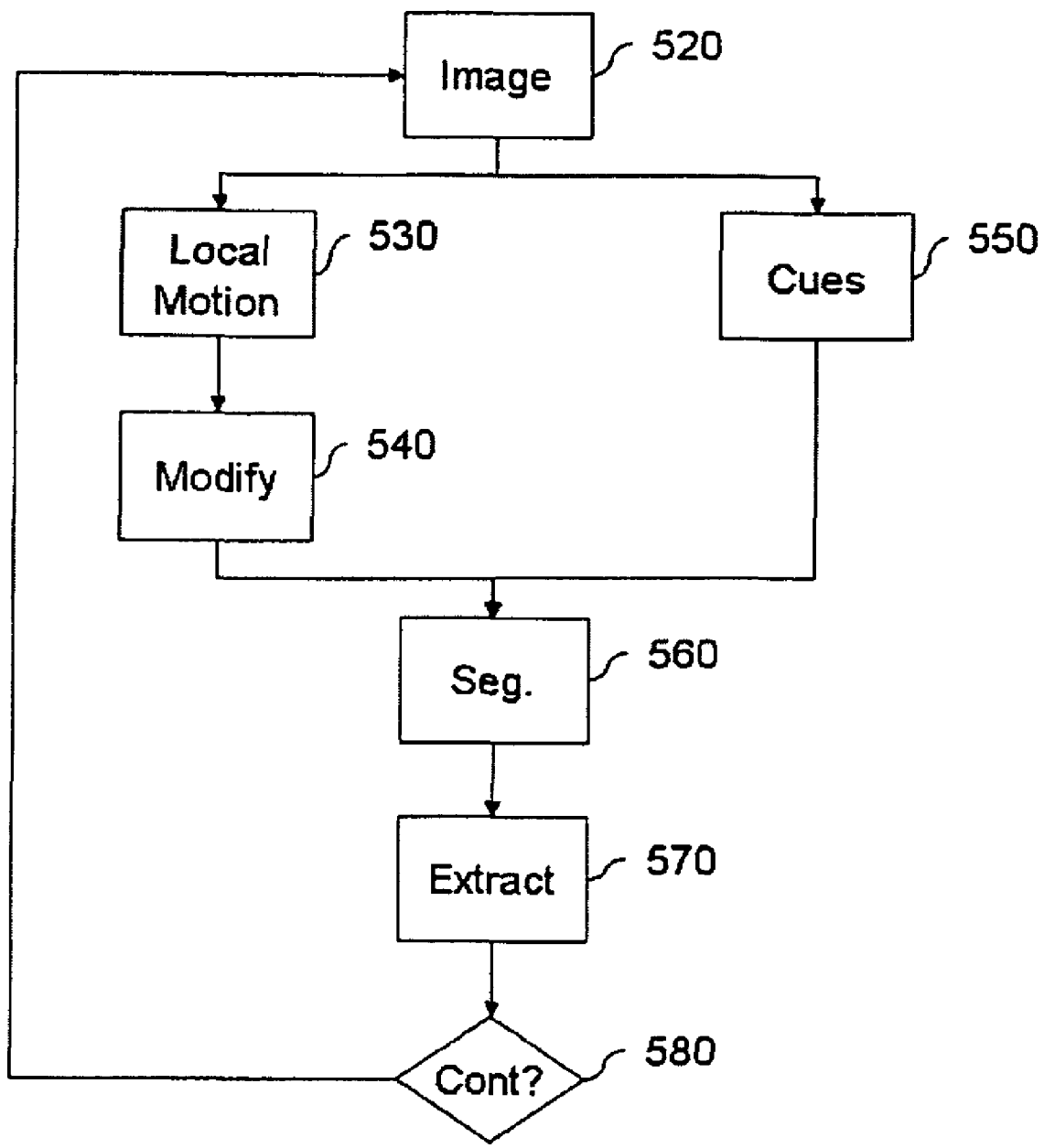
FIG. 5 shows an overview of a device according to an embodiment of the invention.

FIG. 5 shows an overview of a device according to one embodiment of the invention. Particularly, the device comprises means for acquiring an image 520; means for calculating local motion estimations and confidences for each position of the image 530; means for modifying a level-set function 540 based on the local motion estimations and the confidences; means for obtaining input features of the image 550 by using a series of cues; means for calculating a mask segregating the figure region from the back-ground region of the image 560 using the modified level-set function and the obtained input features; means for extracting the figure region from the image 570; and means for checking whether a termination criterion is met 580.

Not shown in FIG. 5 is a means for initializing the device, analogously to above-described method step 110 (which is present in alternate embodiments of the invention shown in FIG. 5). The means for acquiring an image 520 may comprise one or several cameras. It may also be capable of providing infrared images.

The method and/or device according to the invention provide the capability of tracking one or several objects online.

They may be used in a system requiring this capability, e.g. a robot or a car. In a robot, the method and/or device according to the invention may be used in triggering further actions of the robot, like approaching or grasping a particular object. In a car, the identified object may be subjected to further image classification methods, providing e.g. the capability to recognize traffic signs. This information may subsequently be used in a driver assistance system of the car, e.g. for emitting a warning signal or automatic velocity control.

Summarizing, embodiments of the present invention proposes an object contour following approach based on level-set methods for image segmentation and probabilistic motion estimation or motion estimation enhanced by confidence measures, respectively. Using level-set methods for the object detection enables us to overcome the problems imposed by nonrigid object deformations and object appearance changes that lead in tracking applications with dynamic template adaptation to template drift and in applications without template adaptation to decreasing robustness. Utilizing the probabilistic motion estimation for the prediction of the object contour constitutes a non-parametric prediction model that is capable of representing nonrigid object deformation, complex and rapid object movements and thus providing the segmentation method with a reliable initial contour that leads to a robust and quick convergence of the level-set method even in the presence of a comparably low camera frame rate. Furthermore, a novel interpretation of the value of the level-set function is introduced: Unlike most recent level-set methods that consider exclusively the sign of the level-set function to determine an object and its surroundings, the invention uses the value of the level-set function to reflect the confidence in the predicted initial contour. This yields a robust and quick convergence of the level-set method in those sections of the contour with a high initial confidence and a flexible, mostly unconstrained and quick convergence in those sections with a low initial confidence.

Additional details regarding the mathematical support for the invention is now described. The object contour tracking framework is based on a standard two-region level-set method for image segmentation $H(x)=1$ for $x>0$ and $H(x)=0$ for $X \leq 0$. In a level-set frame work, a level-set function $\phi \in \Omega \rightarrow R$ is used to divide the image plane $\Omega$ into two disjoint regions, $\Omega_1$ and $\Omega_2$, where $\phi(x)>0$ if $x \in \Omega_2$. Here we adopt the convention that $\Omega_1$ indicates the background and $\Omega_2$ the segmented object. A functional of the level-set function $\phi$ can be formulated that incorporates the following constraints: (a) segmentation constraint: the data within each region $\Omega_1$ would be as similar as possible to the corresponding region description $p_i$; (b) smoothness constraint: the length of the contour separating the regions $\Omega_i$ should be as short as possible.

This leads to the expression $$E(\phi) = \nu \int_\Omega |\nabla H(\phi)| dx - \sum_{i=1}^{2} \int_\Omega \chi_i(\phi) \log p_i dx \quad (1)$$

Where that $\phi$, $x_i$ and $p_i$ are functions over the image position x, with the Heaviside function $H(\phi)$ and $x_1 = H(\phi)$ and $x_2 = 1 - H(\phi)$. That is, the $x_i$'s act as region masks, since $x_i = 1$ for $x \in \Omega_i$ and 0 otherwise. The first term acts as a smoothness term, that favours few large regions as well as smooth regions boundaries, whereas the second term contains assignment probabilities $p_1(x)$ and $p_2(x)$ that a pixel at position x belongs to the inner and outer regions $\Omega_1$ and $\Omega_2$, respectively, favouring a unique region assignment.

Minimization of this functional with respect to the level-set function $\phi$ using gradient descent leads to $$\frac{\partial \phi}{\partial t} = \delta(\phi) \left[ \nu \text{div}\left(\frac{\nabla \phi}{|\nabla \phi|}\right) + \log \frac{p_1}{p_2} \right]. \quad (2)$$

A region descriptor $p_i(f)$ that depends on the image feature vector f serves to describe the characteristic properties of the outer vs. the inner regions. The assignment probabilities pi(x) for each image position are calculated based on an image feature vector via $p_i(x) := pi(f(x))$. The parameters of the region descriptor $p_i(f)$ are gained in a separate step using the measured feature vectors $f(x)$ at all positions $x \in \Omega_i$ of a region i.

Probabilistic Optic Flow Estimation

The characteristic motion pattern of an object in an image sequence $I^{1:t}$ at time t is given by the optical flow V within the region that constitutes the object. The optical flow $V = \{v_x\}$ is the set of velocity vectors $v_x$ of all pixels at every location x in the image I, meaning that the movement of each pixel is represented with one velocity hypothesis. This representation neglects the fact that in most cases the pixel movement cannot be unambiguously estimated due to different kinds of motion-specific correspondence problems (e.g., the aperture problem) and noisy data the measurement is based on. Especially for the case of transparent moving objects that overlap or partly occlude each other several motion hypotheses are needed to fully describe the image movement within the overlapping regions.

As has been suggested and discussed by several authors, velocity probability density functions (pdf's) are well suited to handle several kinds of motion ambiguities. Following these ideas we model the uncertainty of the optical flow V as follows:

$$P(V | Y^t) = \prod_x P(v_x | Y^t) \text{ with } Y^t = \{I^t, I^{t-1}\}. \quad (3)$$

where the probability for the optical flow $P(V|Y^t)$ is composed of locally independent velocity pdf's $P(V_x|Y^t)$ for every image location x. $P(V_x|Y^t)$ can be calculated using several standard methods.

These pdf's fully describe the motion estimations available for each position x, taking along (un)certainties and serving as a basis for the probabilistic prediction method for object contour tracking.

Probabilistic Prediction Method for Object Contour Tracking

In general, level-set methods evaluate exclusively the sign of the level-set function to determine an object and its surroundings. The exact value of the level-set function is not considered by most approaches. Signed-distance functions are a common means of regulating the value of the level-set function, as they enforce the absolute value of the gradient of the level-set function to be one. Thus many level-set algorithms requiring the computation of the gradient become simpler and furthermore, the value of the level-set function corresponds to the distance from the contour.

For the approach in this invention, and will be explained in detail in the next section, it is required to extend the common "meaningless" understanding of the values of the level-set function. Considering the front propagation and gradient descent nature of the applied level-set method for image segmentation, the height of the level-set function influences the time (number of iterations) until the occurrence of a zero crossing (change of region assignment), in particular in the presents of a maximum time step value, required for numerical stability. Thus sections of the contour 3 (where the contour is defined as the locations of the level-set function where it equals zero) exhibiting high values of the level-set function in their neighborhood move slower compared to those, featuring lower values of the level-set function in their neighborhood. Following that idea, a steep gradient of the initial level-set function for a segmentation algorithm yields a slow movement of the contour, whereas a flat gradient leads to a mostly unconstrained and quick movement. Altogether this results in the possibility to control the velocity of the propagated front, embedded entirely and without any algorithmic changes in a standard level-set framework for image segmentation. Certainly the steering of the velocity of the contour might also be introduced by a local modulation parameter overlaid with the segmentation evolution, but this would cause higher computational effort and require changes in the segmentation algorithm.

Level-Set Based Segmentation in Image Sequences

Building a level-set based object tracker, a trivial approach would be the usage of the final level-set function of the preceding image $\phi^{t-1}$ as the initial level-set function $\hat{\phi}^t$ of the current image. To accelerate the convergence of the minimization process one might also use a smoothed version of the level-set function:

$$\hat{\phi}^t = K_\sigma * \phi^{t-1} \quad (4)$$

The performance of this approach depends on the velocity and deformations of the tracked object. While the approach will succeed in tracking the object in the presents of small movements and deformation, it is likely to fail, under huge deformations or large object movements.

To circumvent the above mentioned problem, tracking algorithms include a prediction stage that estimates the object position in the next frame. Introducing a first order prediction method in our level-set based framework would consider the last two segmentation results $x_2^{t-1}$ and $x_2^{t-2}$, measure the transformation between them and predict the current segmentation initial on the basis of the measured transformation. A parametric approach, based on an affine transformation A, requires the estimation of four parameters, namely the translation vector $t=(t_x, t_y)^T$, the rotation $\omega$ and scale s, called state vector $s=(t_x, t_y, \omega, s)T$ in tracking terminology. In a level-set framework the object translation might be estimated by the translation of the center of gravity of the inside masks $x_2^{t-1}$ and $x_2^{t-2}$, the rotation by the evaluation of the principal component of the two masks (where the eigenvector to the largest eigenvalue of the covariance matrix of the positions of the points within the mask) and the scale by the square root of the mask size ratio.

$$\hat{\phi}^t = A(\phi^{t-1}, s^{t-1}) \text{ with } s^{t-1} = F(x_2^{t-1}, x_2^{t-2}) \quad (5)$$

In contrast to the above approach with "zero order" prediction, even objects with high velocities can be tracked, as long as they move to some extend conform to the assumed model. Object movements that violate the object models, in particular high dynamical movements again lead to failure.

To cope with high dynamic movements, higher order prediction models might be exploited, but they still underlie the limitation to movements that approximately follow the assumed model. Another approach includes the measurement of the real motion of all pixels (optic flow), belonging to the object, thus providing a means to accurately estimate the object position in the next frame, even in the presents of high dynamical movements, that most motion models are not able to cover. Extending the above approach by the measuring of optic flow leads to the estimation of the state vector $s=(t_x, t_y, \omega, s)^T$ from the flow field $V(I_{t-1}, I_t)$, that might be achieved by a regression analysis R.

$$\hat{\phi}^t = A(\phi^{t-1}, s^t) \text{ with } s^t = R(V(I^t, I^{t-1}), x_2^{t-1}) \quad (6)$$

Although the actual pixel velocities within the object are measured and used for an accurate prediction of the object position, an affine model is used for the transformation of the contour of the object. Strong non-affine deformations of the object will still lead to an imprecise initialization of the image segmentation algorithm that might decrease the speed of convergence and the robustness of the segmentation.

In the next section a purely non-parametric approach is introduced that comprises both a non-parametric estimation of the object position and a non-parametric estimation of the object deformation.

Probabilistic Prediction Method

Consequently extending the object tracking algorithm, developed in the previous section, incorporates the optic flow measurement not only in the estimation of the object position, but also in determining the accurate deformation of the object. The optic flow V already contains all information required. Utilizing an image processing warp algorithm $W_v$, that moves each pixel within an image according to a given vector field, enables us to purely non-parametrically predict an initial level-set function $\hat{\phi}^t$ for the segmentation of the current image $I^t$.

$$\hat{\phi}^t = W_v(\phi^{t-1}, V(I^t, I^{t-1})) \quad (7)$$

In the warping of the previous final level-set function $\phi^t$ to the current initial level-set function $\hat{\phi}^t$, there are two things, worth having a closer look at. First, it might happen, that no velocity vector points to a given location in the warped level-set function and thus it is unclear how to set the corresponding value. In this case, two strategies are reasonable; (i) estimating the value by interpolation of the values of its neighborhood or (ii) simply leaving the value uninitialized at zero, in level-set terminology this corresponds to a location, that does neither belong to the inside nor to the outside and thus will be reasonable assigned to the one or the other region by the first iteration of the level-set evolution. Second, more than one velocity vector might point to a given location. Here, the sum of all values, that corresponding to the optical flow, will move to that location, is a reasonable solution. As introduced above, the height of the level-set function can serve as a confidence measure of the region assignment and thus a linear superposition will accumulate all hypotheses on the assignment of the given location.

In a last step, to introduce an even more robust and faster convergence of the proposed algorithm, the entire velocity $P(V|Y^t)$ is exploited in the prediction stage to determine not only an accurate initial region $\hat{x}_2^t$, but also provide an optimal slope of the initial level-set function $\hat{\phi}^t$. Utilizing a weighted warping algorithm $W_p$, that moves each pixel within an image not only in one direction, but in all possible directions and overlays all moved pixels weighted by the probability $P(V|Y^t)$ for the given pixel and direction, enables us to determine both, the optimal initial region $\hat{\phi}^t$ and the optimal slope of the initial level set function $\hat{\phi}^t$.

$$\hat{\phi}^t = W_p(\phi^{t-1}, P(V|Y^t)) \text{ with } Y^t = \{I^t, I^{t-1}\} \quad (8)$$

The proposed approach keeps the motion ambiguities and yields a flat gradient of the initial level-set function at those sections of the contour, where the information from the optical flow is ambiguous and offers only low confidence, leading to a mostly unconstrained and quick convergence. By contrast, in section of the contour where the optical flow has a high confidence, the initial level-set function features a steep gradient, enforcing only little change to the contour.

Altogether the proposed approach enables both, the prediction and the level-set image segmentation stage to take over the evolution of the contour, in sections, where the corresponding algorithm is superior to the other, i.e. in sections of the contour with little structure and thus only small confidence in the optic flow measurement, the segmentation stage will drive the contour evolution, whereas in other section, where the optic flow estimation is very accurate, the impact of the segmentation stage on the contour evolution is suppressed.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for segregating a figure region from a background region in image sequences from dynamic visual scenes, comprising the steps of:
   (a) acquiring an image;
   (b) determining local motion estimations and confidences for each position of the image;
   (c) modifying a level-set function by moving and distorting the level-set function with the local motion estimations and smearing it based on the local motion confidences, to generate a predicted level set function that is geometrically in correspondence with the image and diffused at positions where the confidence of the motion estimation is low;
   (d) obtaining input features of the image by using a series of cues;
   (e) calculating a mask segregating the figure region from the background region of the image using the modified level-set function and the obtained input features;
   (f) extracting the figure region from the image; and
   repeating steps (a)-(f) until a termination criterion is satisfied.

2. The method of to claim 1, further comprising the step of:
   calculating a global motion pattern for the figure region;
      wherein the results from the local motion estimation as well as the global motion pattern calculation are used in the modifying the level-set function step.

3. The method of claim 2, wherein the cues comprise motion information determined in the determining local motion step or the calculating a global motion step.

4. The method of claim 3, wherein the cues further comprise cues from an infrared camera system.

5. The method of claim 1, wherein the image acquisition occurs via cameras mounted on a moving platform such as a robot or a car.

6. The method of claim 1, wherein at least one of the input images or the motion estimation include mechanisms that compensate for an expected motion of the objects in the input image and of the level-set function and the object contour from the segmentation.

7. The method of claim 1, wherein the figure-ground segregation step incorporates information and constraints about an objects expected characteristic form or about its contour properties.

8. The method of claim 1 for controlling a robot or a car.

9. A computer program product embodied on a non-transitory computer readable medium which when executed performs the method steps of claim 1.

10. A device for segregating a figure region from a background region in image sequences from dynamic visual scenes, comprising:
    acquiring means for acquiring an image;
    determining means for determining local motion estimations and confidences for each position of the image;
    modifying means for modifying a level-set function by moving and distorting it with the local motion estimations and smearing it based on the local motion confidences, resulting in a predicted level set function that is geometrically in correspondence with the image and diffused at positions where the confidence of the motion estimation is low;
    features means for obtaining input features of the image by using a series of cues;
    mask means for calculating a mask segregating the figure region from the background region of the image using the modified level-set function and the obtained input features;
    extraction means for extracting the figure region from the image; and
    termination means for checking whether a termination criterion is met.

11. The device of claim 10, wherein the device is one of a robot or a car.

* * * * *